United States Patent [19]

Munson et al.

[11] Patent Number: 5,033,697
[45] Date of Patent: Jul. 23, 1991

[54] PILOT HEAD SUPPORT APPARATUS

[75] Inventors: Kenton M. Munson, Monrovia; Jordan Wiener, Los Angeles, both of Calif.

[73] Assignee: Rockwell International Corporation, El Segundo, Calif.

[21] Appl. No.: 415,695

[22] Filed: Oct. 2, 1989

[51] Int. Cl.[5] ............................................. B64D 25/02
[52] U.S. Cl. ......................... 244/151 R; 244/122 AG; 244/122 R
[58] Field of Search ................. 244/122 AG, 122 AE, 244/122 R, 122 A, 151 R, 121; 297/392, 484, 465; 128/878; 280/801, 749, 753; 2/2, 2.5, 44, 92, 102, 338

[56] References Cited

U.S. PATENT DOCUMENTS 3,645,259  2/1972  Schulman ................. 244/122 AG
4,784,352  11/1988  Smith et al. .............. 244/122 AG
4,834,322  5/1989  Wurst ...................... 244/122 AG Primary Examiner—Joseph F. Peters, Jr.
Assistant Examiner—Anne E. Bidwell
Attorney, Agent, or Firm—Lawrence N. Ginsberg; Charles T. Silberberg

[57] ABSTRACT

An apparatus for supporting the head of a crew member sitting in a forward posture in a vehicle during high "G" accelerations is disclosed. The invention comprises an upper torso assembly secured to the crew member's upper torso and a head support member. The head support member is hingedly connected to the upper torso assembly for preventing the crew member's head from rotating forward when sitting in a forward lean posture during high G accelerations. The apparatus thereby maintains the proper head position for viewing aircraft displays and viewing the vehicle's external environment. The head support member further allows for free head mobility when the crew member is in the normal upright sitting position.

10 Claims, 2 Drawing Sheets

PILOT HEAD SUPPORT APPARATUS

BACKGROUND OF THE INVENTION

1. Field of the Invention

This invention is related to head restraint systems for vehicles, and more particularly to an apparatus for supporting the head of a crew member of a vehicle while the crew member is sitting in a forward lean posture during high "G" accelerations.

2. Description of the Related Art

Modern high performance fighter aircraft are capable of flight maneuvers which subject the crew members to very high accelerations, "G's." Severe stresses are placed upon the crew members by such aircraft maneuvers. Indeed, many modern aircraft are capable of aerial maneuvers which are beyond the tolerance of the human crew members. Consequently, fighter aircraft and their crew members are occasionally lost.

Several approaches have been proposed for protecting the crew member from the effects of high "G" accelerations. For example, U.S. Pat. No. 4,664,341, issued to R. J. Cummings, entitled "HEAD RESTRAINT SYSTEM" (assigned to Rockwell International Corporation), discloses a system which helps enable free and unencumbered head movement during tolerable lateral inertia forces, while locking in place and protecting the pilot's head during periods of high lateral inertia forces. The invention utilizes a helmet that rotates on a track and in an inertia reel, which will lock when lateral forces exceed predetermined levels.

Great Britain Patent No. 656,079, entitled "IMPROVEMENTS IN OR RELATING TO HEAD AND LIKE SUPPORTS FOR PERSONS SUBJECTED TO ACCELERATION FORCES" discloses a head supporting device for resisting acceleration forces on the human body. A support member is mounted to be movable in the direction of the acceleration force and is coupled to a counter-balancing mass which is subjected to the same acceleration force.

Great Britain Patent No. 978,422, entitled "IMPROVEMENTS IN SEATS" discloses the use of a helmet restraining device which is securely attached to the seat and clasps the helmet between a pair of cranked hinged arms, the arms being under the direct influence of spring influenced operating plungers, and the indirect influence of the tension springs operating on hinged detents. Several other elements are required, including slotted grid-engaging racks and wires interlinked with the slots for restraining movement of the helmet relative to the arms.

U.S. Pat. No. 3,170,659, issued to P. W. Wood, Jr., entitled "HEAD RESTRAINT FOR USE IN SPACE VEHICLES," discloses a head restraint for restraining the head movement of a crew member occupying a seat structure in a space vehicle during acceleration and attitude changes of the vehicle. The head restraint utilizes a pair of air flap members which are movably joined to opposite sides of a rear head support. The rear head support is joined to a frame member adapted for joining to the seat structure in the space vehicle. A pair of anchor blocks are joined to the frame member to laterally straddle the air flap members. A pair of adjusting means are joined to the anchor blocks for engaging the adjacent air flap member and adjusting the lateral position of each of the air flap members to restrain the head of the occupying crew member.

U.S. Pat. No. 3,376,064 discloses the use of a rigid U-shaped head encircling member pivotally attached to a head limiting member. The head encircling member is spaced from the head to allow normal movement thereof but restraining the same from unusual lateral and forward movement.

Other restraining devices are disclosed in U.S. Pat. No. 2,638,293; U.S. Pat. No. 4,004,763; U.S. Pat. No. 3,179,360; U.S. Pat. No. 3,278,230; U.S. Pat. No. 3,099,261; U.S. Pat. No. 4,339,151; U.S. Pat. No. 3,873,996; and U.S. Pat. No. 3,925,822.

Sitting in a forward lean position has been demonstrated to increase a pilot's ability to withstand the G force caused by aircraft high turns. However, in this position, it is difficult to impossible, depending on the G force, to hold one's head up. If unsupported, the head rolls forward so that the chin rests on the chest. The line of sight is thus downwards towards the floor.

None of the above-cited references addresses the specific problem as to how to effectively hold the head up while utilizing a forward leaning posture. Even if some of the above disclosed devices may be used during such a forward leaning posture, the devices are typically complex and do not allow unrestricted head movement while the crew member is in an upright position.

U.S. patent Ser. No. 07/249,794, entitled "HEAD SUPPORT/SPINE OFFLOADING EJECTION SEAT INSERT" assigned to the present assignee, discloses a seat insert insertable within the existing seat of a vehicle for maintaining a crew member of the vehicle in a forward posture during high G acceleration. The seat insert includes an elongated head support member for supporting the crew member's head during a forward leaning posture. A helmet support strap extends from the upper end of the head support member to the top of the crew member's helmet for distributing weight off of the cervical spine and for maintaining the head in an "eyes up" attitude in forward lean. A second strap extends from the upper end of the head support member to the back of the helmet for limiting head/helmet differential rotation.

OBJECTS AND SUMMARY OF THE INVENTION

It is therefore a principal object of the present invention to provide the necessary head support for a pilot when full forward leaning during high G turns, yet permit complete head mobility in erect and moderate forward lean position.

It is another object of the present invention to provide a head support device which is adjustable and/or custom made to accommodate pilots of differing anthropometry.

It is another object of the present invention to provide a head support device which is physically and functionally compatible with crew personnel equipment, including helmet, oxygen mask and torso harness.

It is yet another object to provide a device which is compatible with ejection seat components including parachute and inertia reel straps, and ejection seat in-flight and post-ejection function.

The present invention is an apparatus for supporting the head of a crew member sitting in a forward posture in a vehicle during high "G" accelerations. In its broadest aspects, the invention comprises an upper torso assembly secured to the crew member's upper torso and head support means. The head support means is hingedly connected to the upper torso assembly for preventing the crew member's head from rotating forward when sitting in a forward lean posture during high G accelerations. The apparatus thereby maintains the proper head position for viewing aircraft displays and viewing the vehicle's external environment. The head support means further allows for free head mobility when the crew member is in the normal upright sitting position.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters, while equivalent elements bear a prime designation.

DETAILED DESCRIPTION OF THE PREFERRED EMBODIMENT

Figure 1:
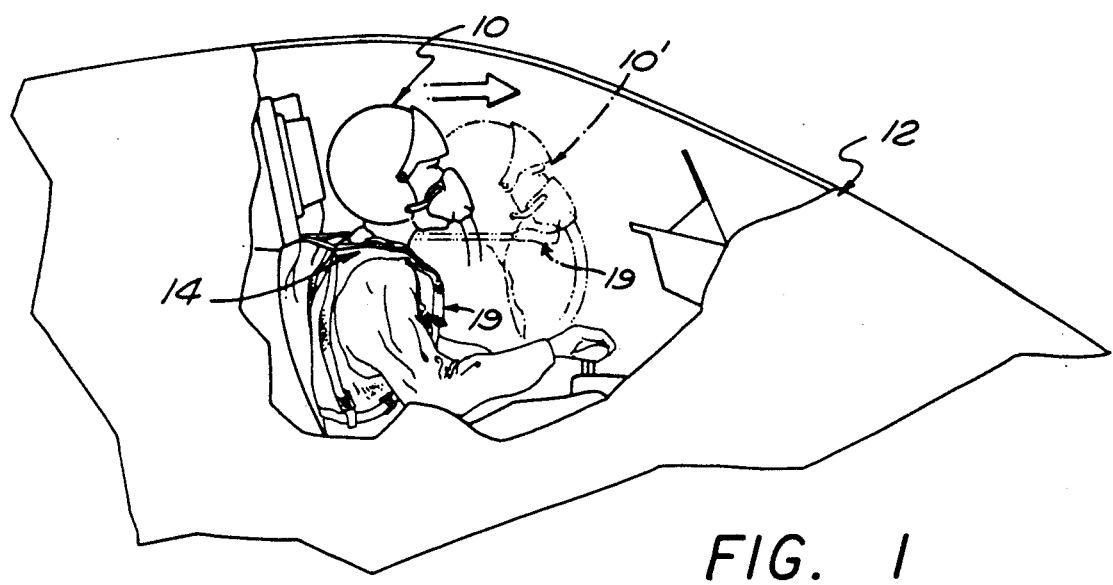
FIG. 1 illustrates a crew member in the cockpit of an aircraft, utilizing the apparatus of the present invention.

Referring now to the drawings and the characters of reference marked thereon, FIG. 1 illustrates a pilot 10 sitting in the cockpit of an aircraft 12. The pilot 10 is accommodated with the apparatus 14 of the present invention. During relatively low accelerations the crew member 10 sits relatively erect or upright, and the apparatus 14 is in a stowed position. However, when the crew member is subjected to relatively high accelerations during certain flight maneuvers, he moves toward a forward lean position, and a portion of the apparatus 14 rotates upwardly to support the crew member's head, as illustrated by phantom line 10' and will be disclosed in detail below.

Figure 2:
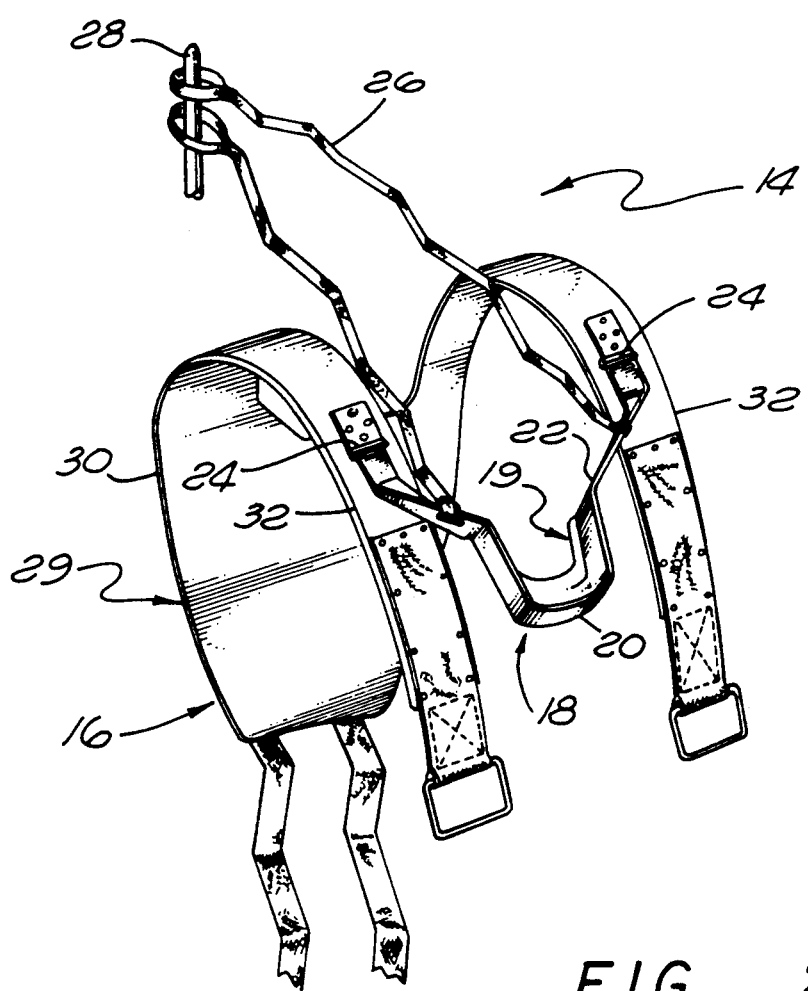
FIG. 2 illustrates a front perspective view of the apparatus of the present invention.

Referring now to FIG. 2, it can be seen that the apparatus 14 includes an upper torso assembly 16 and head support means 18 hingedly connected thereto. The head support means 18 includes a unitary, rigid head support member 19 having a chin support portion 20 and a lever arm portion 22. The lever arm portion 22 is connected by hinges 24 to the upper torso assembly 16. The hinges 24 are preferably spring loaded to urge the head support means in a stowed position away from the crew member's chin while that crew member is in an upright posture.

Deployment strap means 26 is connected to the head support means at one end and engages a retractable pin 28 which is connected to the seat back (not shown) of the aircraft. Strap means 26 is preferably formed of thin nylon. To accommodate various degrees of forward leaning, the strap lengths are adjustable.

The upper torso assembly 16 includes an upper torso frame 29 having a back section 30 and two over-the-shoulder sections 32.

Figure 3:
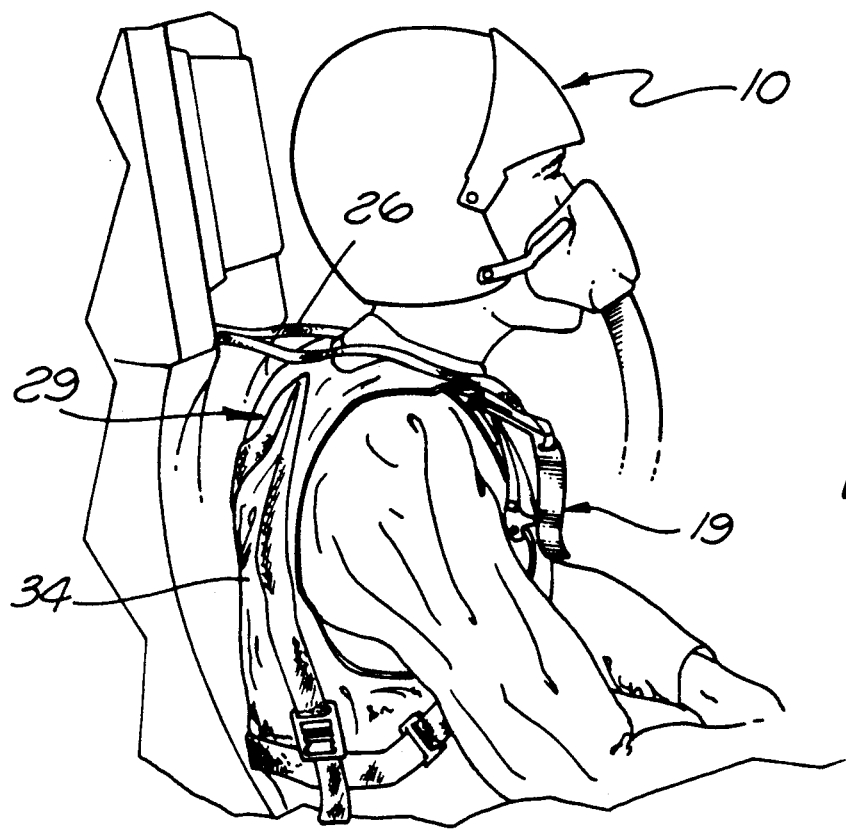
FIG. 3 is a side view showing a crew member in a upright position with the apparatus of the present invention in the stowed position.

Referring now to FIG. 3, the crew member 10 is illustrated in an upright position. This is the preferred position during relatively low accelerations. As can be seen in this figure, the upper torso assembly 16 further includes a torso harness 34 worn over the upper torso frame 29 to secure the frame 29 to the crew member's upper torso. While in this erect position, there is slack in the deployment straps 26 and the head support member 19 is in a stowed position. When sitting upright, the head support member is kept down in this vertical, stowed position and unobtrusively rests on the pilot's chest allowing unrestricted head movement.

Figure 4:
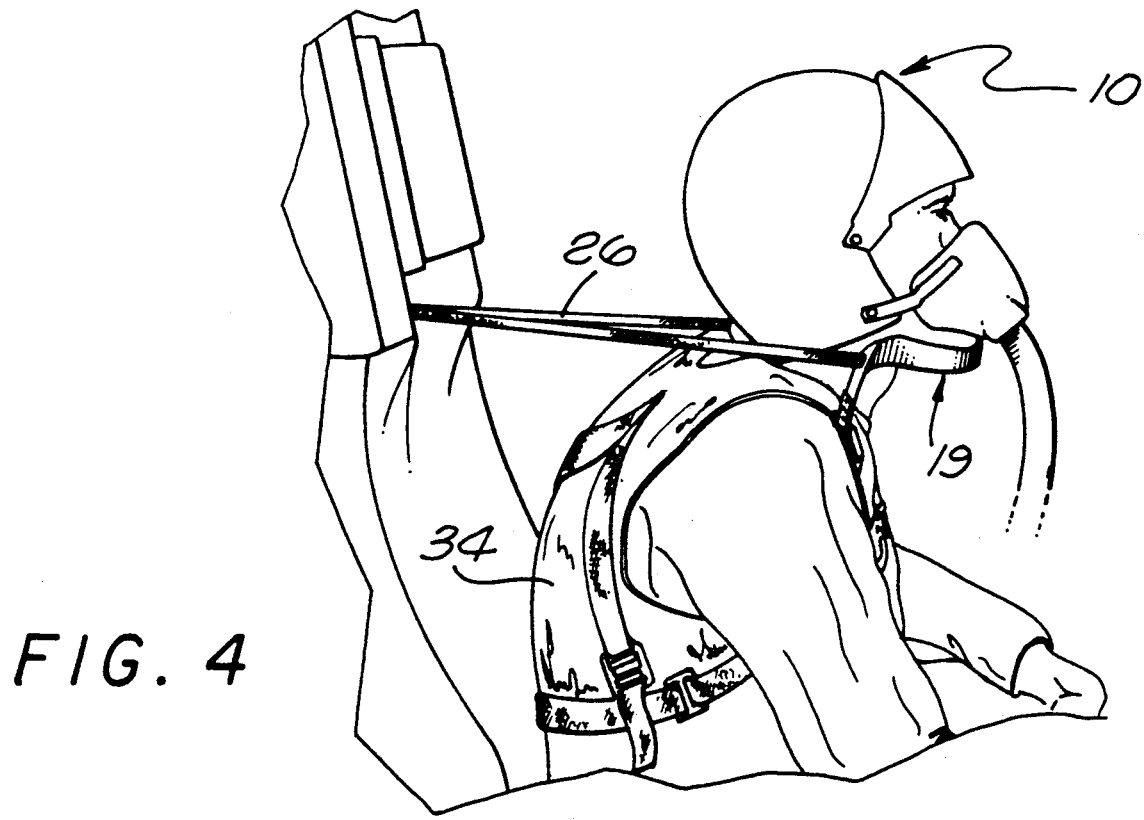
FIG. 4 is a side view showing the crew member in a forward leaning posture, the apparatus of the present invention supporting the crew member's head.

Referring now to FIG. 4, the crew member 10 is illustrated sitting in a forward lean posture. In moving toward this posture, the strap means 26 become taut, forcing the head support member to rotate upwardly providing support for the crew member's chin. Otherwise, the head would roll forward so that the chin would rest on the chest.

The force acting to lift the head is a function of the tension in the straps. The force exerted by the straps on the head support member increases in proportion to aircraft G, since the straps also serve to restrain the upper torso from rotating forward. That is, as aircraft G increases, the upper torso is rotated forward, which places an increasing tension on the straps. Thus, the tension in the straps, which increases with increasing aircraft G level, causes the head support member to lift the head with increasing force.

The head support member 19 is preferably molded of a lightweight, high strength, rigid material such as a lightweight titanium alloy or carbon-based composite. The chin support portion 20, which makes contact with the body, is preferably padded.

The back section 30 extends from the mid-back. The over-the-shoulder sections 32 come down over the front of the chest to mid-chest level. The upper torso frame 29 is designed to be adjustable to accommodate differing pilot anthropometry. It is designed to closely fit the pilot so that it is stabilized on the upper torso. Adjustability may involve accommodating various neck lengths, jaw lengths. The length of the straps can be adjusted to accommodate the variants in shoulder-to-seat back-distance among differing sized pilots when in the full forward lean position.

The deployment straps may be connected to the pin which is used to secure the inertia reel straps. Most ejection seat types have such a pin. The pin is retracted by pulling the ground egress handle or automatically during post ejection seat/man separation, thereby freeing the man from the seat.

The apparatus 14 is designed for easy donning and doffing. The donning procedure is as follows. The upper torso frame 29 is put on first. The torso harness 34 is put on over the upper torso frame 29. The head support member 19 is then attached to the upper torso frame 29 with pip pins. The deployment straps 26 are attached to the release pin 28 in the seat back. Finally, the parachute straps (not shown) are attached to the torso harness 34. The device is taken off using the reverse procedure.

The present invention may be utilized with the seat insert disclosed in the patent application Ser. No. 07/249,794 entitled "HEAD SUPPORT/SPINE OFF-LOADING EJECTION SEAT INSERT". The present invention may also be utilized with co-Applicant Munson's co-pending patent application Ser. No. 07/289,846 entitled "HYDRAULIC BUOYANCY FORCE SUIT".

The apparatus 14 may be manufactured in different sizes to accommodate different anthropometric ranges.

Obviously, other modifications and variations of the present invention are possible in light of the above teachings. For example, the torso harness may be modified to contain an integral frame to which the head support means can be attached. It is therefore to be understood that, within the scope of the appended claims, the invention may be practiced otherwise than as specifically described.

What is claimed and desired to be secured by Letters Patent of the United States is:

1. An apparatus for supporting the head of a crew member of a vehicle in a forward posture during high G accelerations, comprising:
   (a) an upper torso assembly secured to the crew member's upper torso; and
   (b) head support means hingedly connected to said upper torso assembly for preventing the crew member's head from rotating in a forward position when sitting in a forward lean posture during high G accelerations, thereby maintaining proper head position for viewing aircraft displays and for viewing the external environment, said head support means including a head support member having a chin support portion shaped to conform to the chin of a user and a lever arm portion hingedly attached to said upper torso assembly, the apparatus providing free head mobility when the crew member is in the normal upright sitting position.

2. The apparatus of claim 2 wherein said lever arm is spring loaded in a stowed position urging the head support means away from the user's chin during an upright posture.

3. The apparatus of claim 2 wherein said head support means further includes strap means releasably attached at a first end to a seat back of the seat of the aircraft and at second ends to said chin support member, said strap means for supporting the head support members during a forward lean and releasing the head support member during ejection.

4. The apparatus of claim 3 wherein said head support means is releasably attached to said seat back by a retraction pin.

5. An apparatus for supporting the head of a crew member of a vehicle sitting in a forward posture during high G accelerations, comprising:
   (a) an upper torso assembly secured to the crew member's upper torso;
   (b) a head support member hingedly connected to said upper torso assembly for preventing the crew member's head from rotating to a forward position when sitting in a forward lean posture during high G accelerations, said head support member including:
      (i) a chin support portion shaped to conform to the chin of the user; and
      (ii) a lever arm portion hingedly attached in a spring loaded manner to said upper torso assembly, said lever arm portion being biased toward a stowed position, thereby urging the head support member away from the user's chin during an upright posture; and
   (c) deployment strap means releasably attached at a first end to a stationary structure on the aircraft, and attached at second ends to said head support member for supporting the head support member during a forward lean, said deployment strap means releasing the head support member during post ejection seat/man separation and during emergency ground egress, the deployment strap being so arranged, in relation to said stationary structure on said aircraft, so as to maintain the proper head position for viewing the external environment, said head support member providing free head mobility when the crew member is in the normal upright sitting position.

6. The apparatus of claim 5 wherein said upper torso assembly includes:
   (a) an upper torso frame securable over the torso of the user, and
   (b) a torso harness securable over said upper torso frame.

7. The apparatus of claim 5 wherein said head support member is formed of a lightweight titanium alloy.

8. The apparatus of claim 5 wherein said head support member is formed of a carbon-based composite.

9. An apparatus for supporting the head of a crew member sitting in a forward lean posture in a vehicle during high "G" accelerations, comprising:
   (a) an upper torso assembly secured to the crew member's upper torso, said upper torso assembly including:
      (i) an upper torso frame securable over the torso of the user, and
      (ii) a torso harness securable over said upper torso frame;
   (b) an integral head support member hingedly connected to said upper torso assembly for preventing the crew member's head from rotating in forward position while sitting in a forward lean posture during high G accelerations, said head support member including:
      (i) a chin support portion shaped to conform to the chin of the user; and
      (ii) a lever arm portion hingedly attached to said upper torso assembly, said lever arm portion being hingedly attached in a spring loaded manner to be biased toward a stowed position, thereby urging the head support member away from the user's chin during an upright posture; and
   (c) a deployment strap releasably attached at a first end to a structure on the aircraft, and attached at a second end to said head support member for supporting the head support member during a forward lean, said deployment strap releasing the head support member during ejection, the deployment strap being so arranged, in relation to the structure of the aircraft, so as to maintain the proper head position for viewing the external environment, said head support member providing free head mobility when the crew member is in the normal upright sitting position.

10. An apparatus for supporting the head of a crew member of a vehicle in a forward posture during high G accelerations, comprising:
   (a) an upper torso assembly secured to the crew member's upper torso, comprising:
      (i) an upper torso frame securable over the torso of the user, and
      (ii) a torso harness worn over said upper torso frame to secure the frame to the crew member's upper torso; and
   (b) head support means hingedly connected to said upper torso assembly for preventing the crew member's head from rotating in a forward position when sitting in a forward lean posture during high G accelerations, thereby maintaining proper head position for viewing aircraft displays and for viewing the external environment, said head support means providing free head mobility when the crew member is in the normal upright sitting position.

* * * * *